United States Patent
Roffe et al.

(10) Patent No.: US 11,131,344 B1
(45) Date of Patent: Sep. 28, 2021

(54) SNAP-FIT BALL BEARING CAGE

(71) Applicant: Schaeffler Technologies AG & Co. KG, Herzogenaurach (DE)

(72) Inventors: Dennis Roffe, Fort Mill, SC (US); Michael Heaton, Rock Hill, SC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/857,568

(22) Filed: Apr. 24, 2020

(51) Int. Cl.
*F16C 33/38* (2006.01)
*F16C 19/06* (2006.01)

(52) U.S. Cl.
CPC .......... *F16C 33/3887* (2013.01); *F16C 19/06* (2013.01)

(58) Field of Classification Search
CPC ... F16C 19/06; F16C 33/3875; F16C 33/3887
See application file for complete search history.

(56) References Cited

U.S. PATENT DOCUMENTS

| | | | | |
|---|---|---|---|---|
| 4,451,098 A | * | 5/1984 | Farley | F16C 33/3875 384/526 |
| 4,732,496 A | * | 3/1988 | Shail | F16C 33/3875 384/526 |
| 5,131,762 A | | 7/1992 | Waskiewicz | |
| 8,408,808 B2 | * | 4/2013 | Hosmer | F16C 33/6614 384/523 |
| 8,961,023 B2 | * | 2/2015 | Mineno | F16C 33/3875 384/470 |
| 9,512,880 B2 | * | 12/2016 | Yasuda | F16C 33/3875 |
| 9,939,016 B2 | * | 4/2018 | Mocnik | F16C 33/3875 |
| 9,982,716 B2 | * | 5/2018 | Tsuji | F16C 33/3875 |
| 10,030,707 B2 | * | 7/2018 | Taniguchi | F16C 33/3875 |
| 10,247,241 B2 | * | 4/2019 | Taniguchi | F16C 33/3875 |
| 2020/0056661 A1 | * | 2/2020 | Tsuji | F16C 33/3887 |

FOREIGN PATENT DOCUMENTS

KR 20150078455 A 7/2015

* cited by examiner

*Primary Examiner* — Phillip A Johnson

(57) ABSTRACT

A snap-fit ball bearing cage, including: a first ring-half supported for rotation around an axis of rotation and including a plurality of first curved surfaces; a second ring-half including a plurality of second curved surfaces and a plurality of first protrusions non-rotatably connecting the second ring-half to the first ring-half, each first protrusion forming a portion of a radially outer perimeter of the second ring-half, or each first protrusion forming a portion of a radially inner perimeter of the second ring-half; and a plurality of balls. The plurality of first curved surfaces and the plurality of second curved surfaces define a plurality of openings; the plurality of balls is disposed in the plurality of openings. Each first curved surface, included in the plurality of first curved surfaces, is a mirror image of a second curved surface included in the plurality of second curved surfaces.

18 Claims, 15 Drawing Sheets

SNAP-FIT BALL BEARING CAGE

TECHNICAL FIELD

The present disclosure relates to a plastic ball bearing with a rigid, light-weight snap-fit bearing cage having enhanced lubrication of the balls for the ball bearing.

BACKGROUND

It is desirable to decrease the weight of a ball bearing while maintaining needed rigidity and increasing lubrication functionality.

SUMMARY

According to aspects illustrated herein, there is provided a snap-fit ball bearing cage, including: a first ring-half supported for rotation around an axis of rotation and including a plurality of first curved surfaces; a second ring-half including a plurality of second curved surfaces and a plurality of first protrusions non-rotatably connecting the second ring-half to the first ring-half, each first protrusion, included in the plurality of first protrusions, forming a portion of a radially outer perimeter of the second ring-half or each first protrusion, included in the plurality of first protrusions, forming a portion of a radially inner perimeter of the second ring-half; and a plurality of balls. The plurality of first curved surfaces and the plurality of second curved surfaces define a plurality of openings; the plurality of balls is disposed in the plurality of openings. Each first curved surface, included in the plurality of first curved surfaces, is a mirror image of a second curved surface included in the plurality of second curved surfaces.

According to aspects illustrated herein, there is provided a snap-fit ball bearing cage, including: a first ring-half supported for rotation around an axis of rotation and including a first plurality of protrusions integral to the first ring-half and extending radially outwardly and a first plurality of surface segments facing at least partly radially outwardly; a second ring-half including a second plurality of protrusions integral to the second ring-half, non-rotatably connecting the second ring-half to the first ring-half, and extending radially outwardly and a second plurality of surface segments facing at least partly radially outwardly; and a plurality of balls. The first ring-half and the second ring-half define a plurality of openings. Each ball, included in the plurality of balls, is disposed in an opening included in the plurality of openings. The first plurality of surface segments and the second plurality of surface segments define, in a radial direction, a plurality of radially inwardly extending recesses. The first plurality of protrusions and the second plurality of protrusions bracket, in a circumferential direction around the axis of rotation, the plurality of radially inwardly extending recesses.

According to aspects illustrated herein, there is provided a snap-fit ball bearing cage, including: a first ring-half supported for rotation around an axis of rotation and including a plurality of first curved surfaces, each first curved surface having a first maximum extent in a circumferential direction around the axis of rotation and a plurality of first shoulders; a second ring-half including a plurality of second curved surfaces, each second curved surface having a second maximum extent, equal to the first maximum extent, in the circumferential direction; and a plurality of first protrusions non-rotatably connecting the second ring-half to the first ring-half and forming a portion of a radially outermost surface of the second ring-half or forming a portion of a radially innermost surface of the second ring-half, each first protrusion including a distal end with a compression fit with a first shoulder included in the plurality of first shoulders; and a plurality of balls, each ball located in an opening defined by a first curved surface, included in the plurality of first curved surfaces and by a second curved surface included in the plurality of second curved surfaces.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Figure 1:
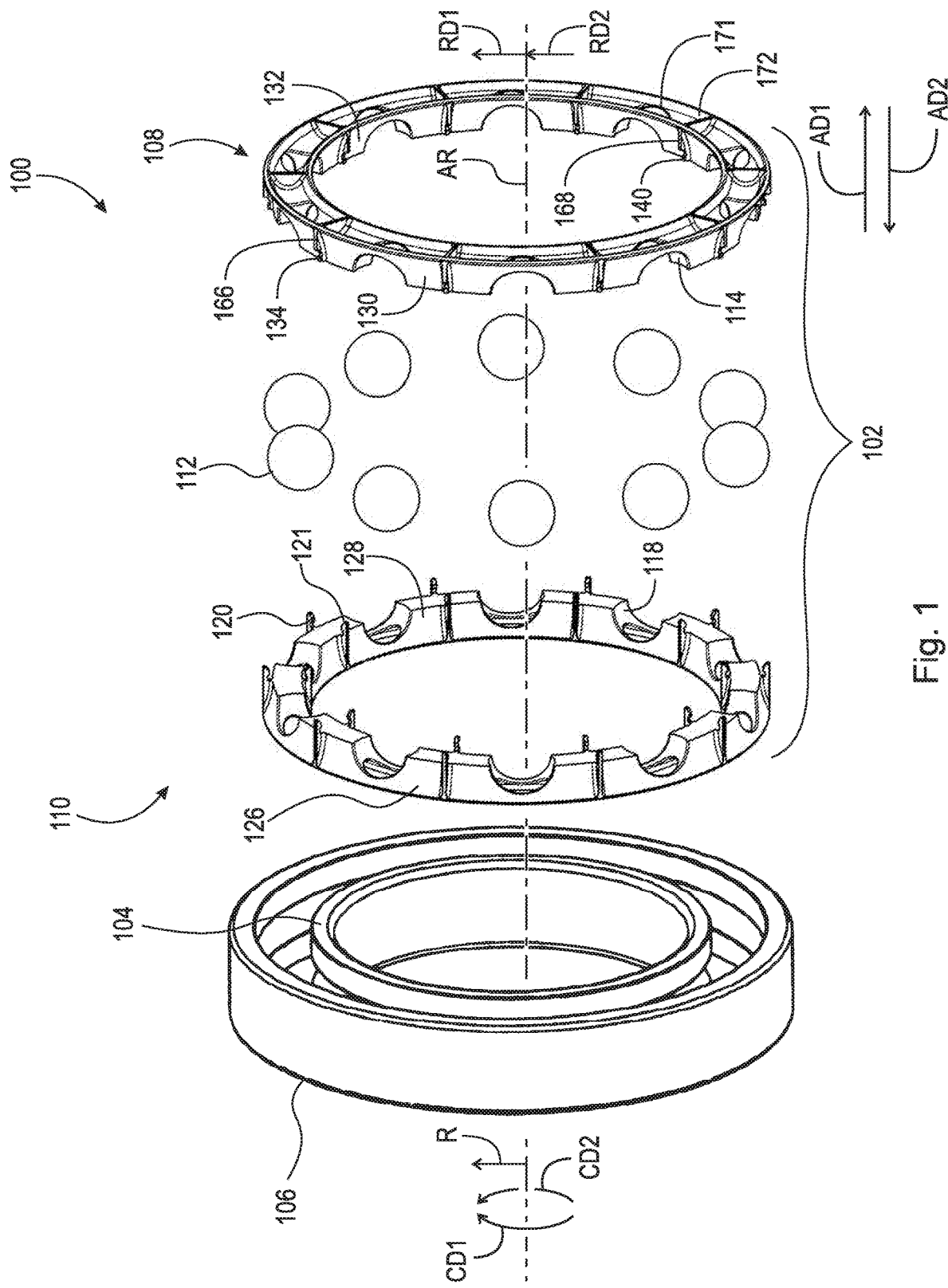
FIG. 1 is an exploded view of a roller bearing with a snap-fit bearing cage.

FIG. 1 is an exploded view of roller bearing 100 with snap-fit bearing cage 102.

Figure 2:
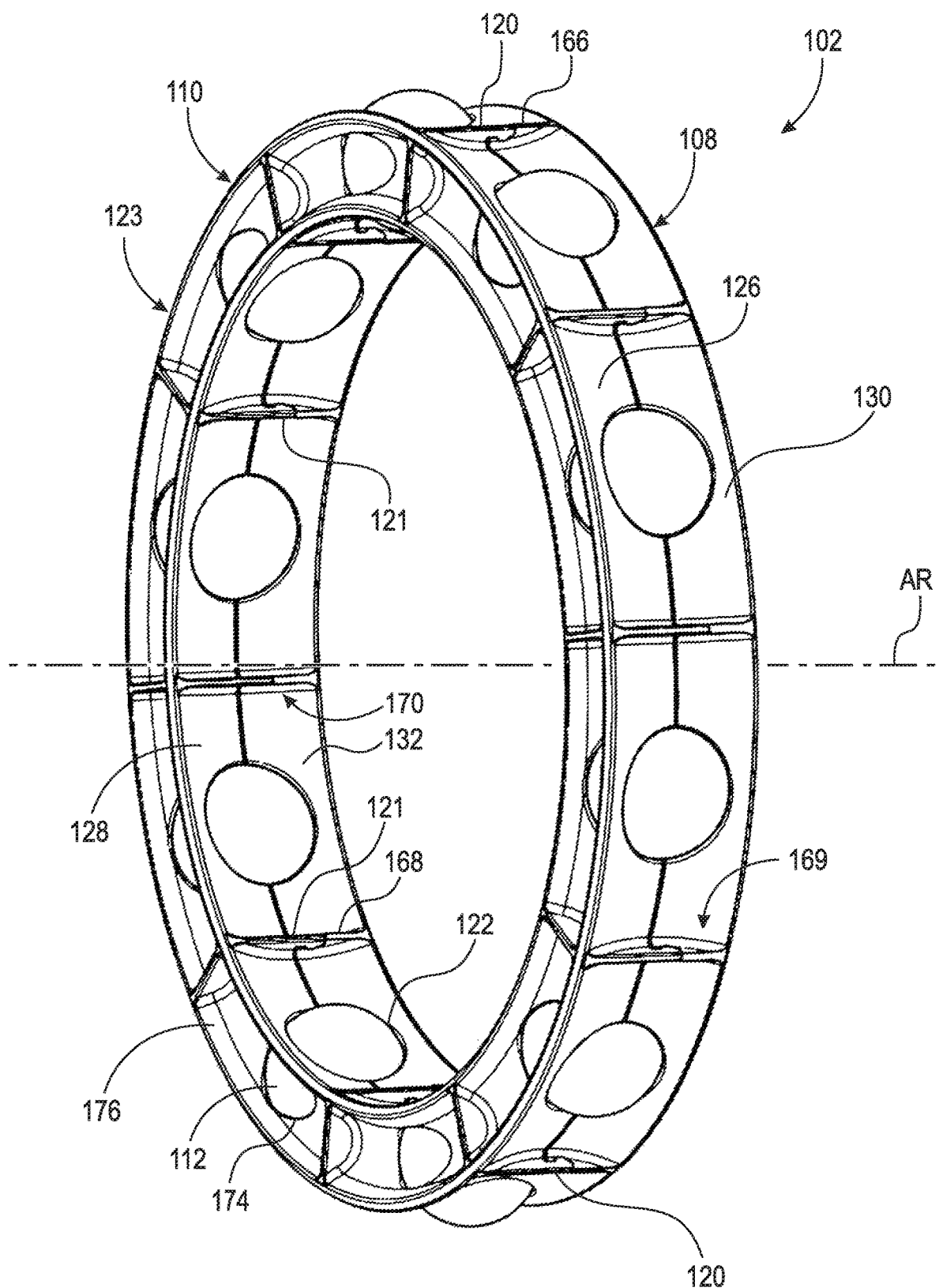
FIG. 2 is a front isometric view of the snap-fit bearing cage shown in FIG. 1.

FIG. 2 is an isometric view of the snap-fit bearing cage shown in FIG. 1. The following should be viewed in light of FIGS. 1 and 2. Bearing 100 includes inner ring 104 and outer ring 106, each supported for rotation around axis of rotation AR. Snap-fit bearing cage 102 is radially disposed between ring 104 and ring 106. Snap-fit bearing cage 102 includes: ring-half 108 and ring-half 110; and balls 112. Ring-halves 108 and 110 are supported for rotation around axis AR. Ring-half 108 includes curved surfaces 114. Ring half 110 includes curved surfaces 118, protrusions 120, and protrusions 121. Surfaces 114 and 118 curve at least in opposite axial directions AD1 and AD2, respectively, parallel to axis of rotation AR.

Figure 3:
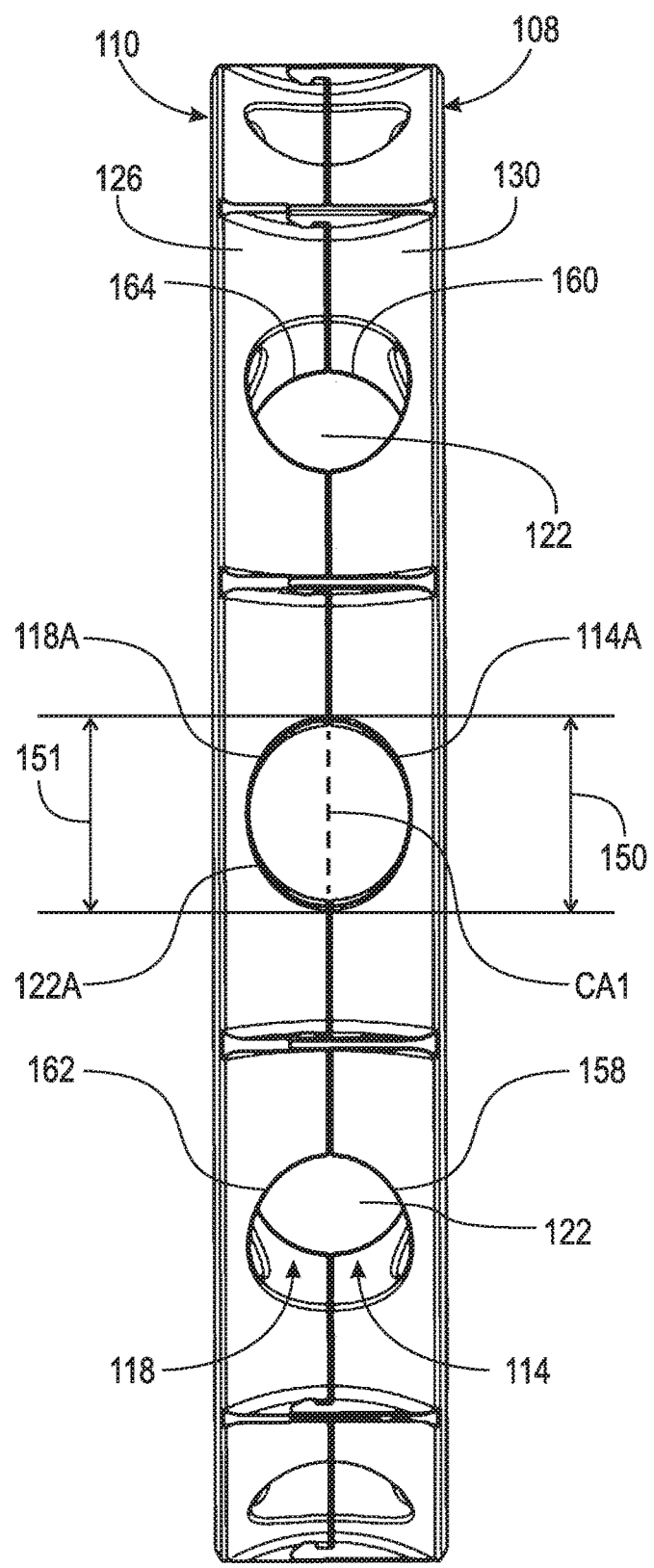
FIG. 3 is a side view of the snap-fit bearing cage shown in FIG. 1 with balls removed.

FIG. 3 is a side view of snap-fit bearing cage 102 shown in FIG. 1 with balls 112 removed.

Figure 4:
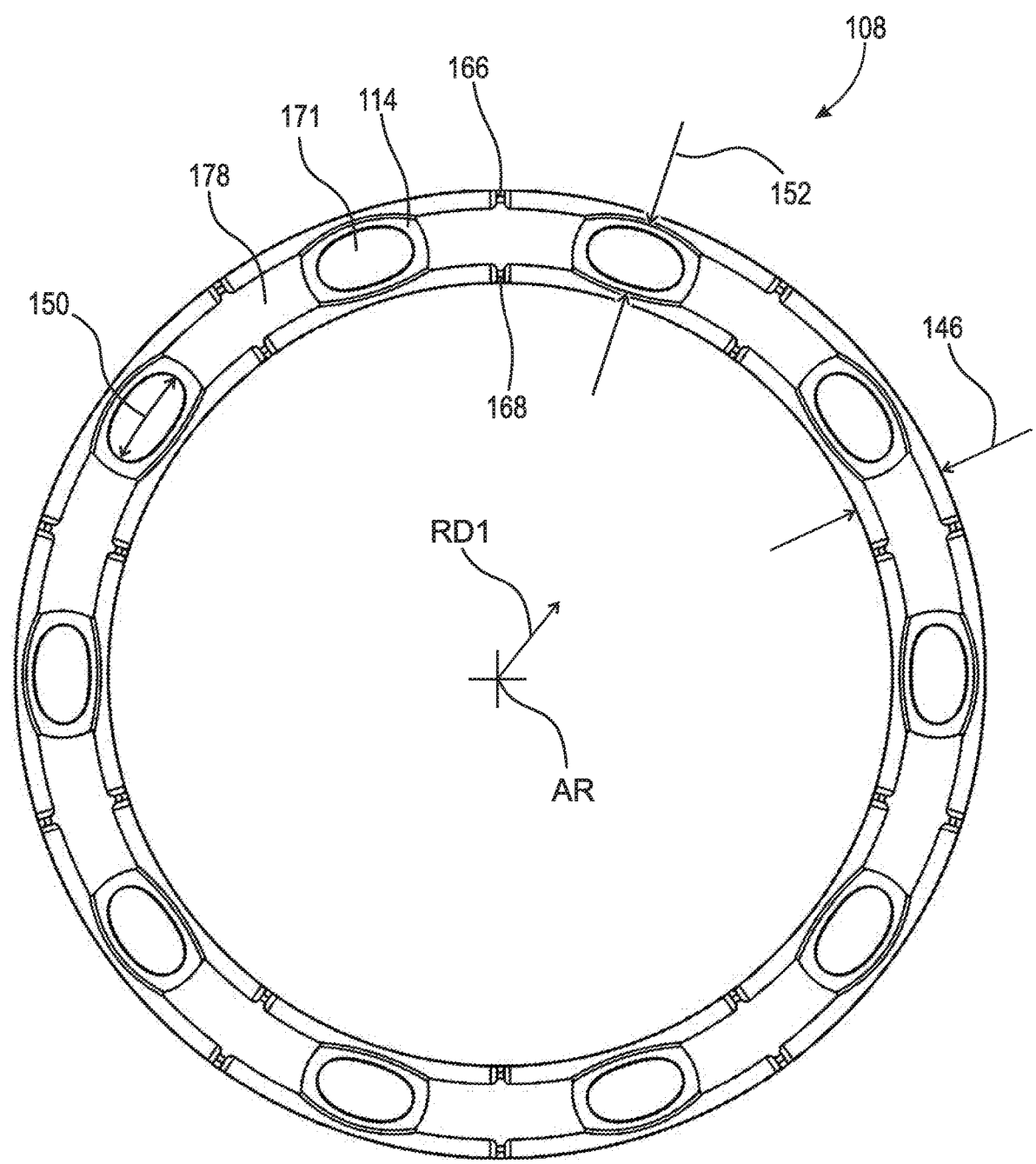
FIG. 4 is a front view of a ring-half shown in FIG. 3.

FIG. 4 is a front view of ring-half 108 shown in FIG. 3.

Figure 5:
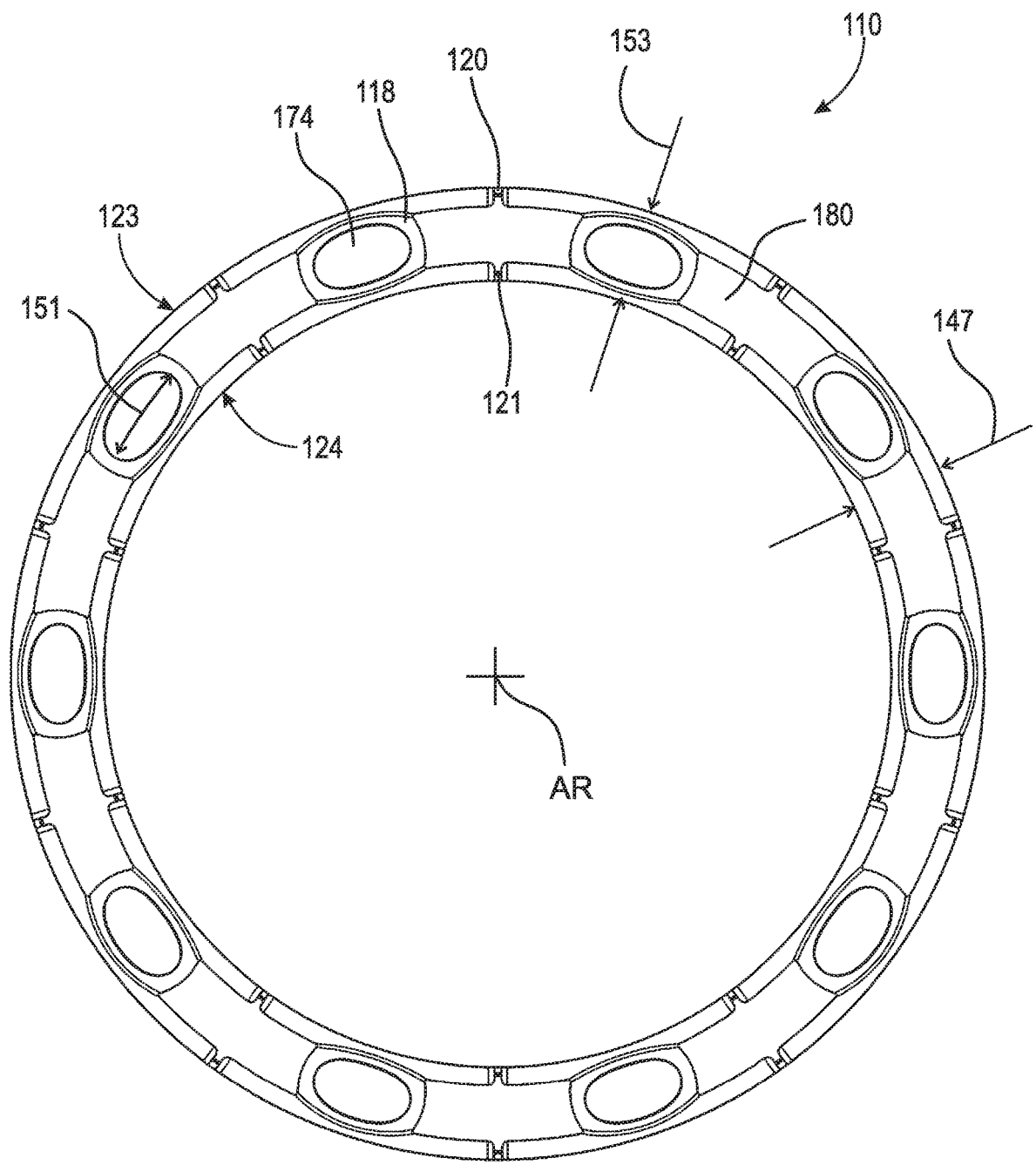
FIG. 5 is a back view of the other ring-half shown in FIG. 3.

FIG. 5 is a back view of ring-half 110 shown in FIG. 3. The following should be viewed in light of FIGS. 1 through 5. Each curved surface 114 forms, or alternately stated defines or brackets, with a curved surface 118, an opening 122 in which a ball 112 is disposed. Protrusions 120 and 121: are in contact with ring-half 108; non-rotatably connect ring-half 110 and ring-half 108; and axially bind ring-half 110 to ring-half 108. That is, protrusions 120 and protrusions 121 prevent ring-half 108 and ring-half 110 from axially separating.

Figure 6:
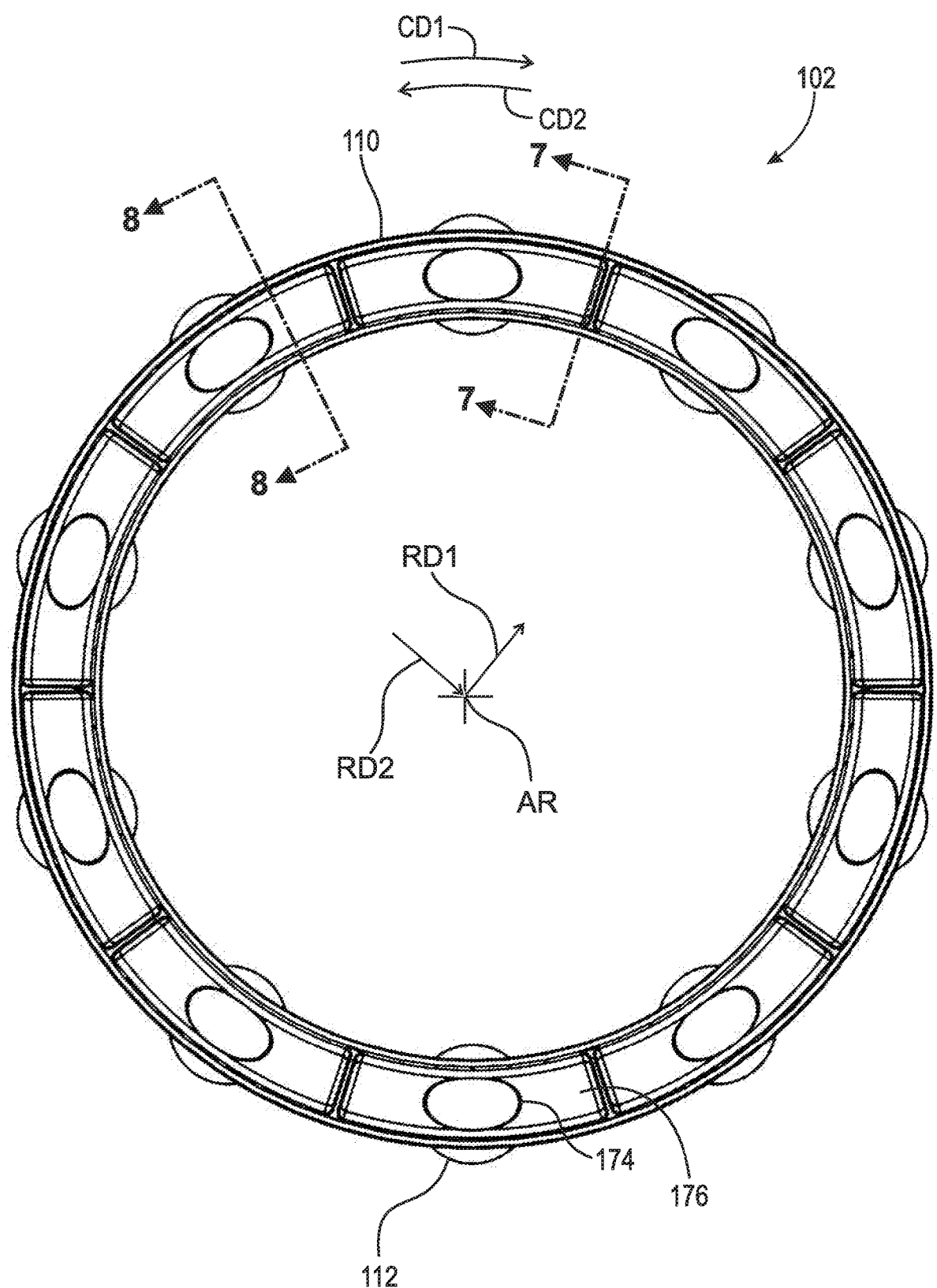
FIG. 6 is a front view of the snap-fit bearing cage shown in FIG. 1.

FIG. 6 is a front view of snap-fit bearing cage 102 shown in FIG. 1.

Figure 7:
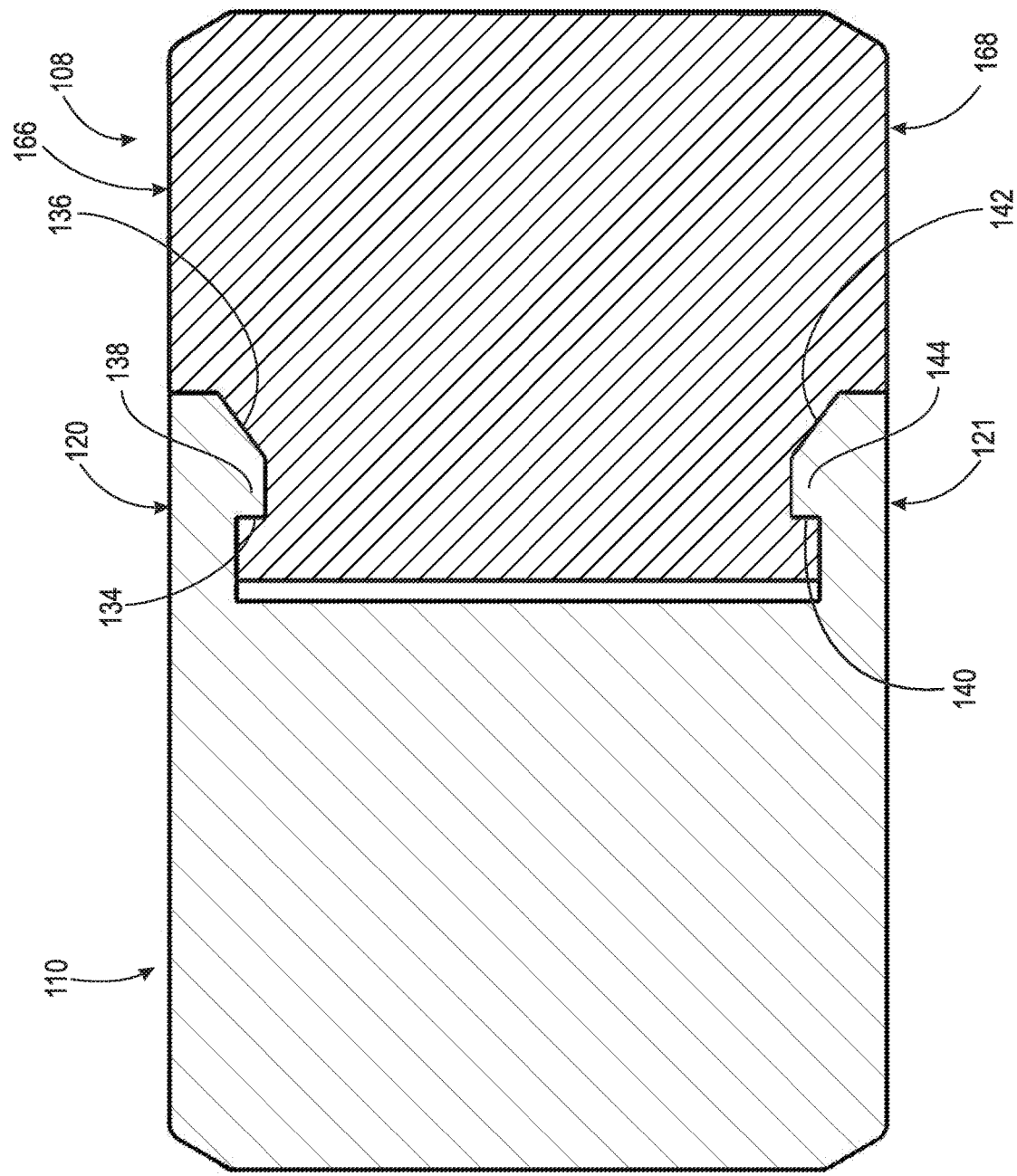
FIG. 7 is a cross-sectional view generally along line 7-7 in FIG. 6.

FIG. 7 is a cross-sectional view generally along line 7-7 in FIG. 6.

Figure 8:
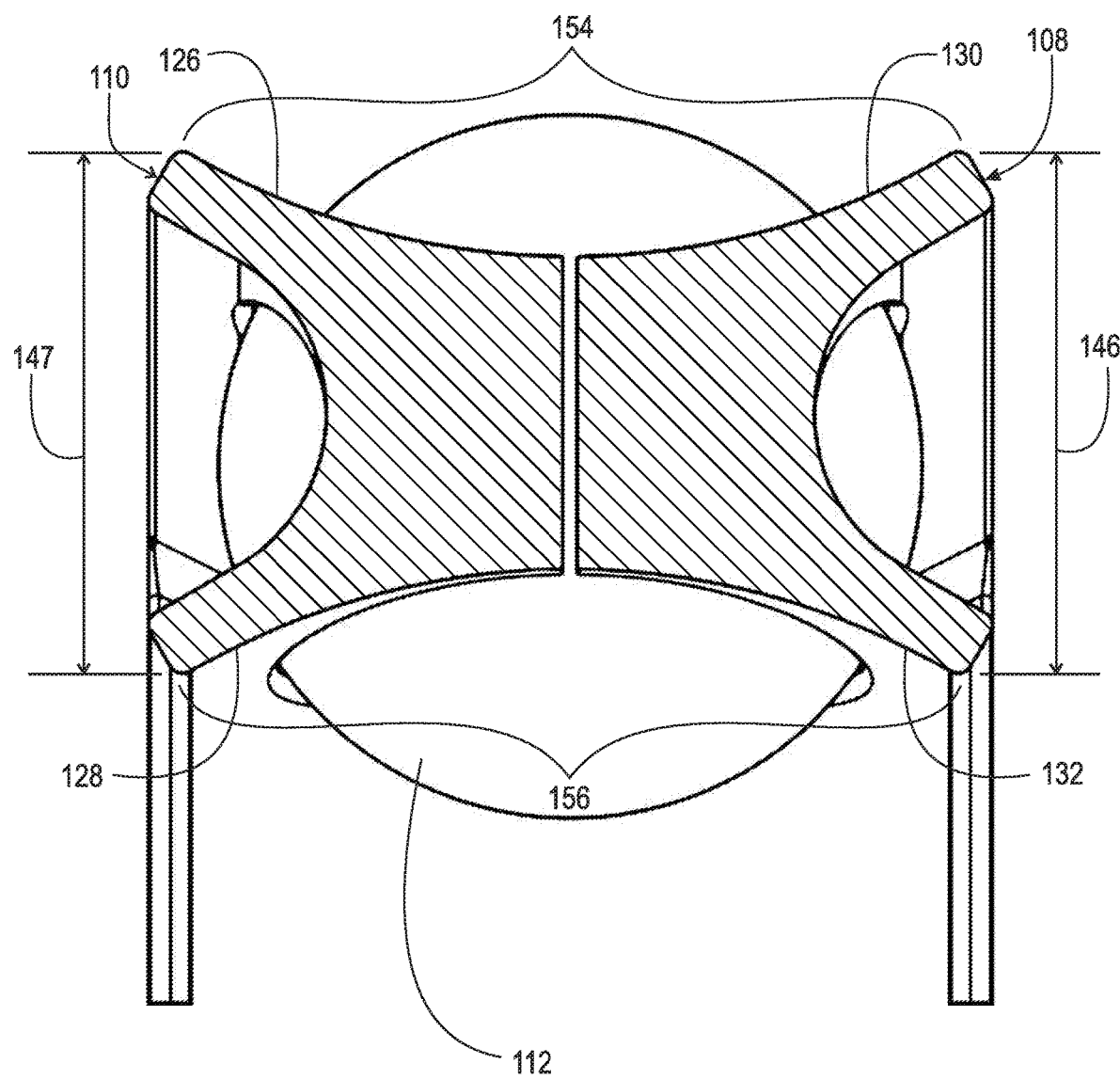
FIG. 8 is a cross-sectional view generally along line 8-8 in FIG. 6.
Figure 8:
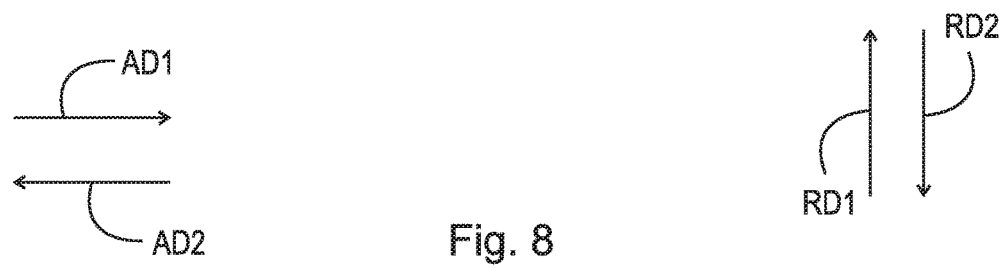

FIG. 8 is a cross-sectional view generally along line 8-8 in FIG. 6. The following should be viewed in light of FIGS. 1 through 8. Each protrusion 120 forms a portion of radially outer perimeter 123 of ring-half 110. Each protrusions 121 forms a portion of radially inner perimeter 124 of ring-half 110. Alternately stated: In the example of FIG. 1, radially outer perimeter 123 includes radially outermost surface segments 126 circumferentially interleaved with protrusions 120; radially inner perimeter 124 includes radially innermost surface segments 128 circumferentially interleaved with protrusions 121.

Capital letters are used to designate a specific component from a group of components otherwise designated by a three digit number, for example, curved surface 114A, discussed below, is a specific examples from the plurality of curved surfaces 114. For each opening 122: the curved surface 114 is a mirror image of the curved surface 118. For example, for opening 122A: curved surface 114A is a mirror image of curved surface 118A with respect to hypothetical circular arc CA1 centered on axis of rotation AR and passing through opening 122A between surfaces 114A and 118A.

For each opening 122: the curved surface 114 and the curved surface 118 are symmetrical. For example, for opening 122A: curved surface 114A and curved surface 118A are symmetrical with respect to hypothetical circular arc CA1.

Segments 126 slope radially inwardly in axial direction AD1. Segments 128 slope radially outwardly in axial direction AD1. In the example of FIG. 1, ring-half 108 includes radially outer surface segments 130 and radially inner surface segments 132. Segments 130 slope radially inwardly in axial direction AD2. Segments 132 slope radially outwardly in axial direction AD2. In an example embodiment: ring-half 108 includes shoulders 134; shoulders 134 define portions of recesses 136; protrusions 120 include hooked distal ends 138; and each distal end 138 is disposed in a recess 136 and has a compression fit with a shoulder 134. In an example embodiment: ring-half 108 includes shoulders 140; shoulders 140 define portions of recesses 142; protrusions 121 include hooked distal ends 144; and each distal end 144 is disposed in a recess 142 and has a compression fit with a shoulder 140. The snap-fit connections described above securely fasten ring-half 110 to ring-half 108.

Ring-half 108 has maximum extent 146 in radial outward direction RD1 perpendicular to axis of rotation AR and ring-half 110 has maximum extent 147 in radial direction RD1. Maximum extent 146 is equal to maximum extent 147. In an example embodiment, each curved surface 114 has maximum extent 150 in circumferential direction CD1, and each curved surfaces 118 has maximum extent 151 equal to maximum extent 150, in direction CD1. Circumferential direction CD1 is illustrated by an end point of radius R rotated around axis AR in a clock-wise direction. Circumferential direction CD2 is opposite direction CD1. In an example embodiment, each curved surface 114 has maximum extent 152 in radial direction RD1, and each curved surfaces 118 has maximum extent 153, equal to maximum extent 152, in direction RD1.

Ring-half 108 and ring-half 110 define: recesses 154 extending radially inwardly; and recesses 156 extending radially outwardly. Recesses 154 are defined in part, for example in radial inner direction RD2, by segments 126 and 130. Recesses 156 are defined in part, for example in radial outer direction RD1, by segments 128 and 132. Curved surfaces 114 include edges 158 and 160 partly bounding recesses 154 and recesses 156, respectively. Curved surfaces 118 include edges 162 and 164 partly bounding recesses 154 and recesses 156, respectively.

The following paragraph is directed to an example embodiment. At least a portion of protrusions 120 extend radially outwardly past segments 126 and at least a portion of protrusions 121 extend radially inwardly past segments 128. Ring-half 108 includes: recess protrusions 166 extending radially outwardly past surface segments 130; and recess protrusions 168 extending radially inwardly past surface segments 132. Recess protrusions 166 and 168 include shoulders 134 and 140, respectively. Pairs of protrusions 120 and recess protrusions 166 form blades 169 bounding, or alternately stated bracketing, recesses 154 in circumferential direction CD1. Blades 169 separate circumferentially adjacent recesses 154.

Pairs of protrusions 121 and recess protrusions 168 form blades 170 bounding, or alternately stated bracketing, recesses 156 in circumferential direction CD1. Blades 170 separate circumferentially adjacent recesses 156. In an example embodiment, protrusions 120 and 121 and recess protrusions 166 and 168 are orthogonal to axis of rotation AR.

In an example embodiment: protrusions 120 and 121 are integral to ring-half 110; and recess protrusions 166 and 168 are integral to ring-half 108. For example: ring-half 110, including protrusions 120 and 121 is a single molded piece of plastic; and ring-half 108 including recess protrusions 166 and 168 is a single molded piece of plastic.

Ring-half 108 defines openings 171 in wall 172 facing in direction AD1. Balls 112 are disposed in openings 171. Ring-half 110 defines openings 174 in wall 176 facing in direction AD2. Balls 112 are disposed in openings 174. In the example of FIG. 1, surfaces 114 are circumferentially interleaved with (alternate with in direction CD1) surfaces 178 facing in direction ADZ and orthogonal to axis AR; and surfaces 118 are circumferentially interleaved with (alternate with in direction CD1) surfaces 180 facing in direction AD1 and orthogonal to axis AR.

Figure 9:
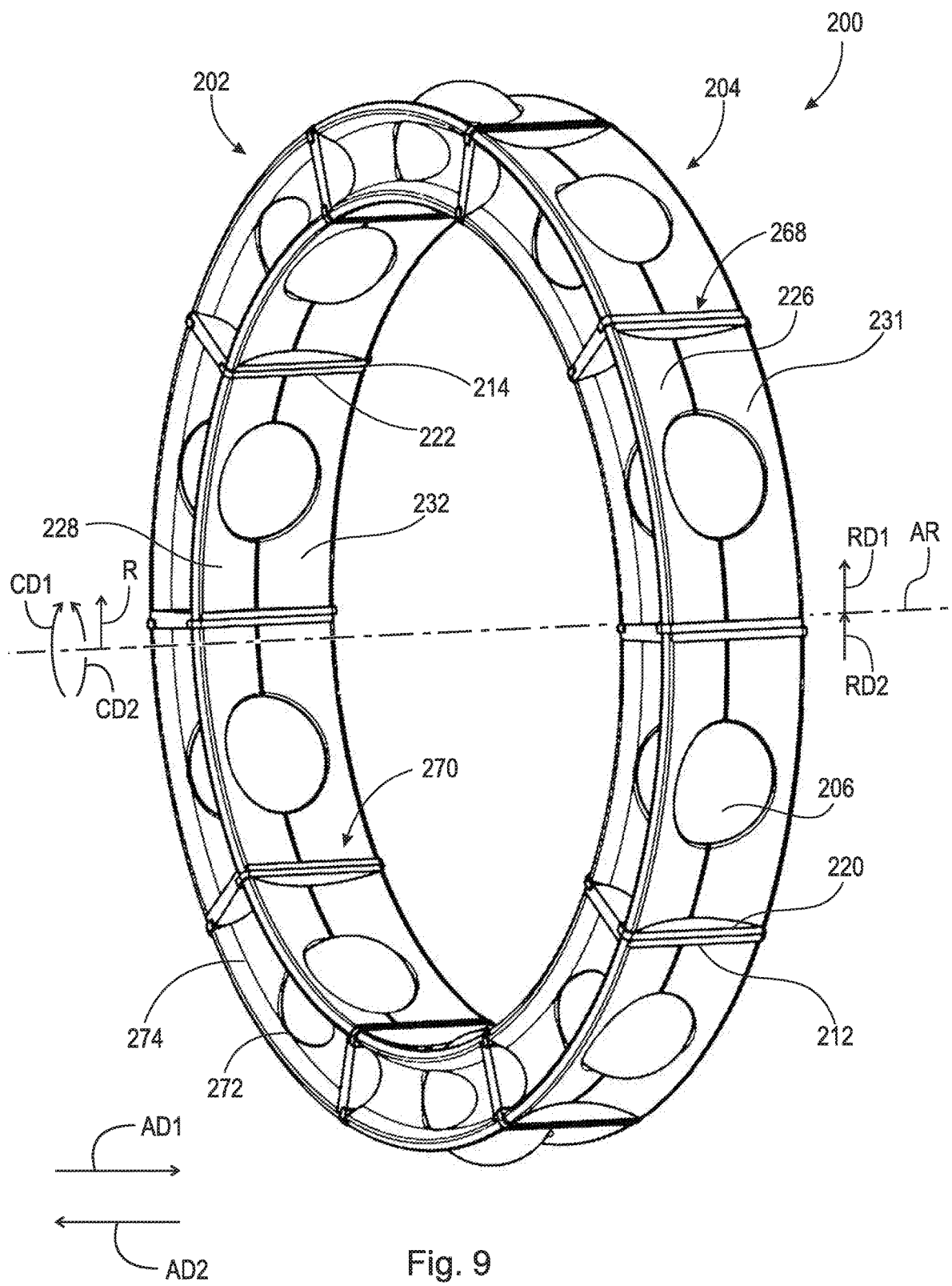
FIG. 9 is an isometric view of a snap-fit bearing cage.

FIG. 9 is an isometric view of snap-fit bearing cage 200.

Figure 10:
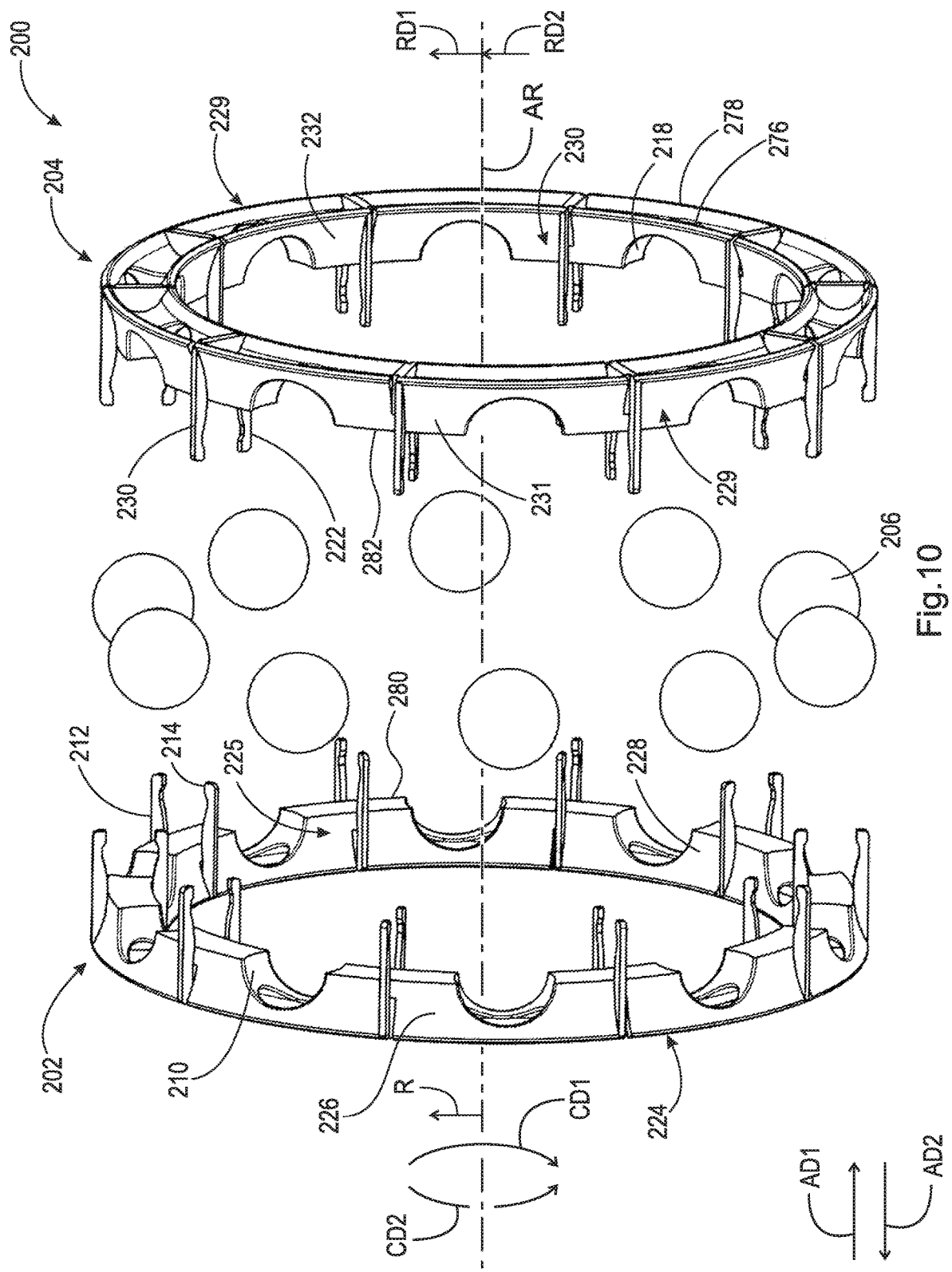
FIG. 10 is an exploded view of the snap-fit bearing cage shown in FIG. 9.

FIG. 10 is an exploded view of snap-fit bearing cage 200 shown in FIG. 9.

Figure 11:
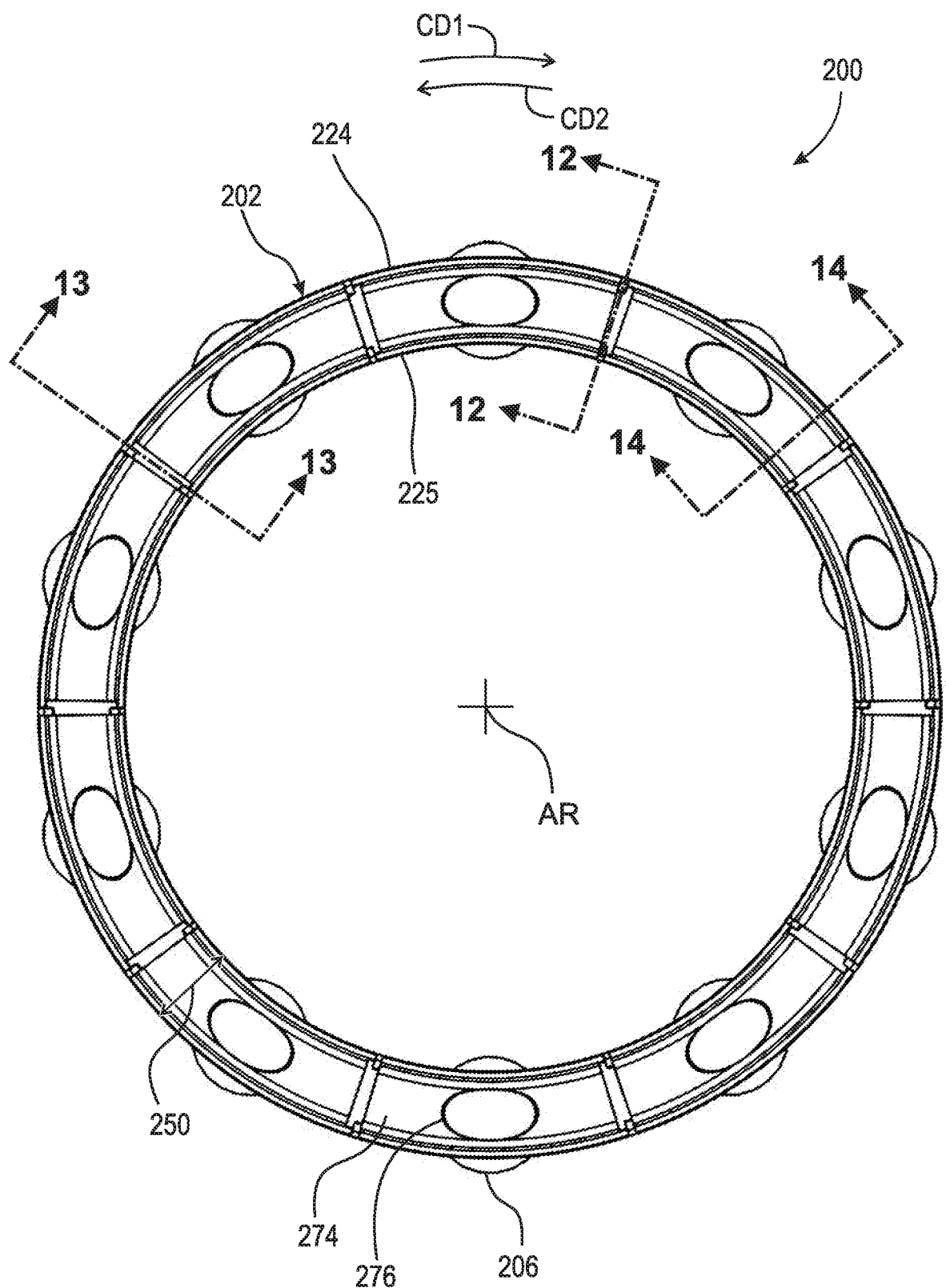
FIG. 11 is a front view of the snap-fit bearing cage shown in FIG. 9.

FIG. 11 is a front view of the snap-fit bearing cage shown in FIG. 9.

Figure 12:
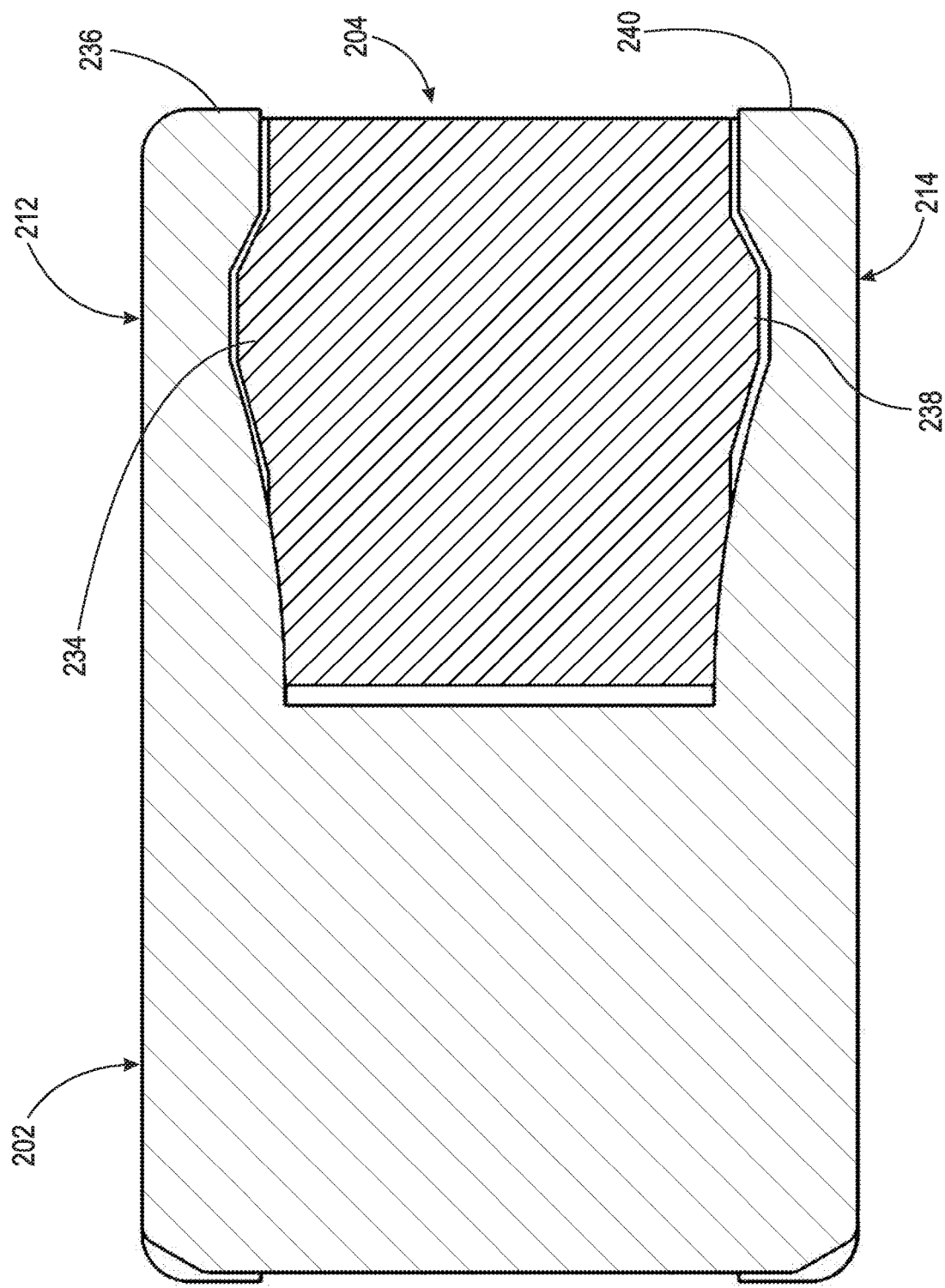
FIG. 12 is a cross-sectional view generally along line 12-12 in FIG. 11.

FIG. 12 is a cross-sectional view generally along line 12-12 in FIG. 11.

Figure 13:
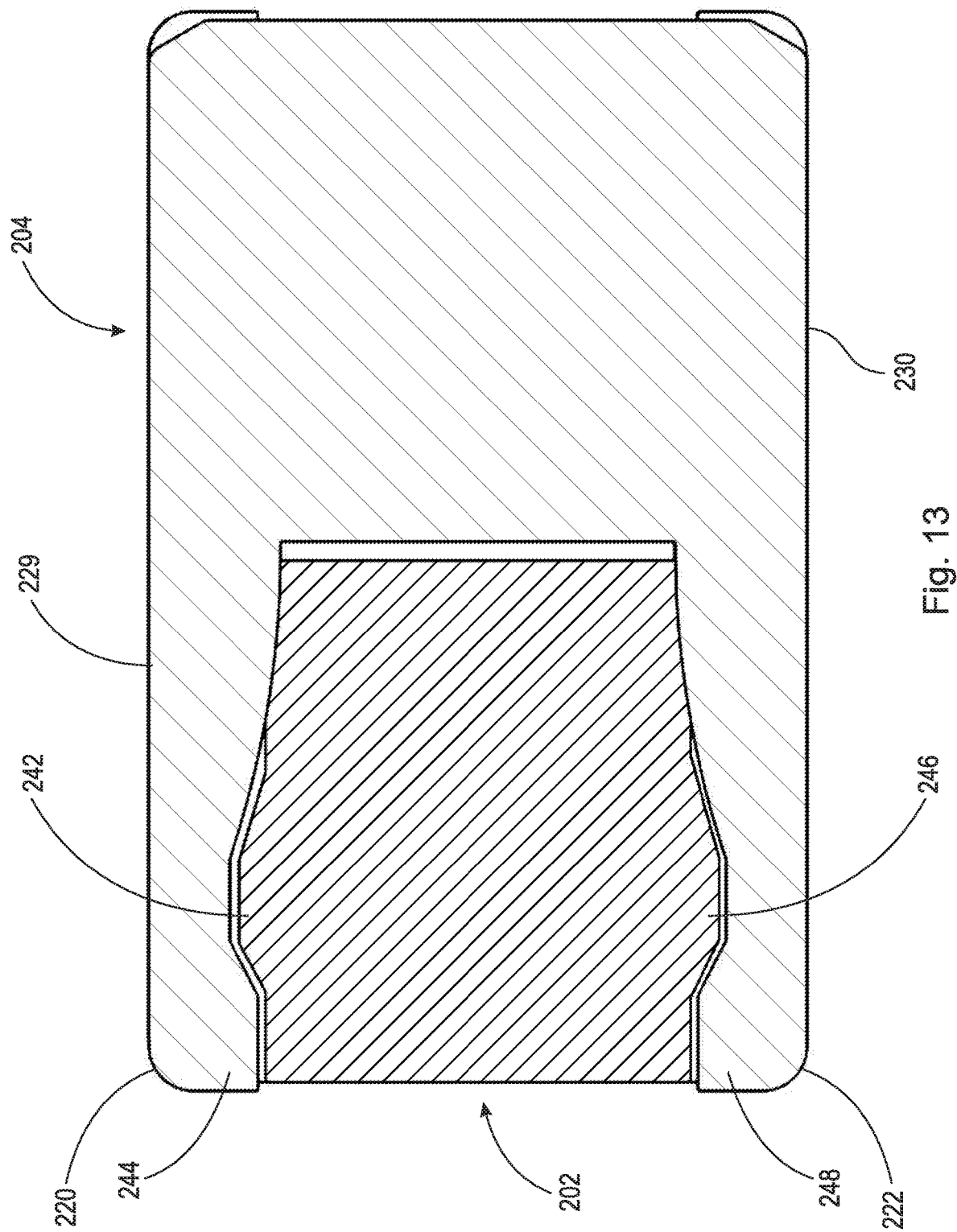
FIG. 13 is a cross-sectional view generally along line 13-13 in FIG. 11.

FIG. 13 is a cross-sectional view generally along line 13-13 in FIG. 11.

Figure 14:
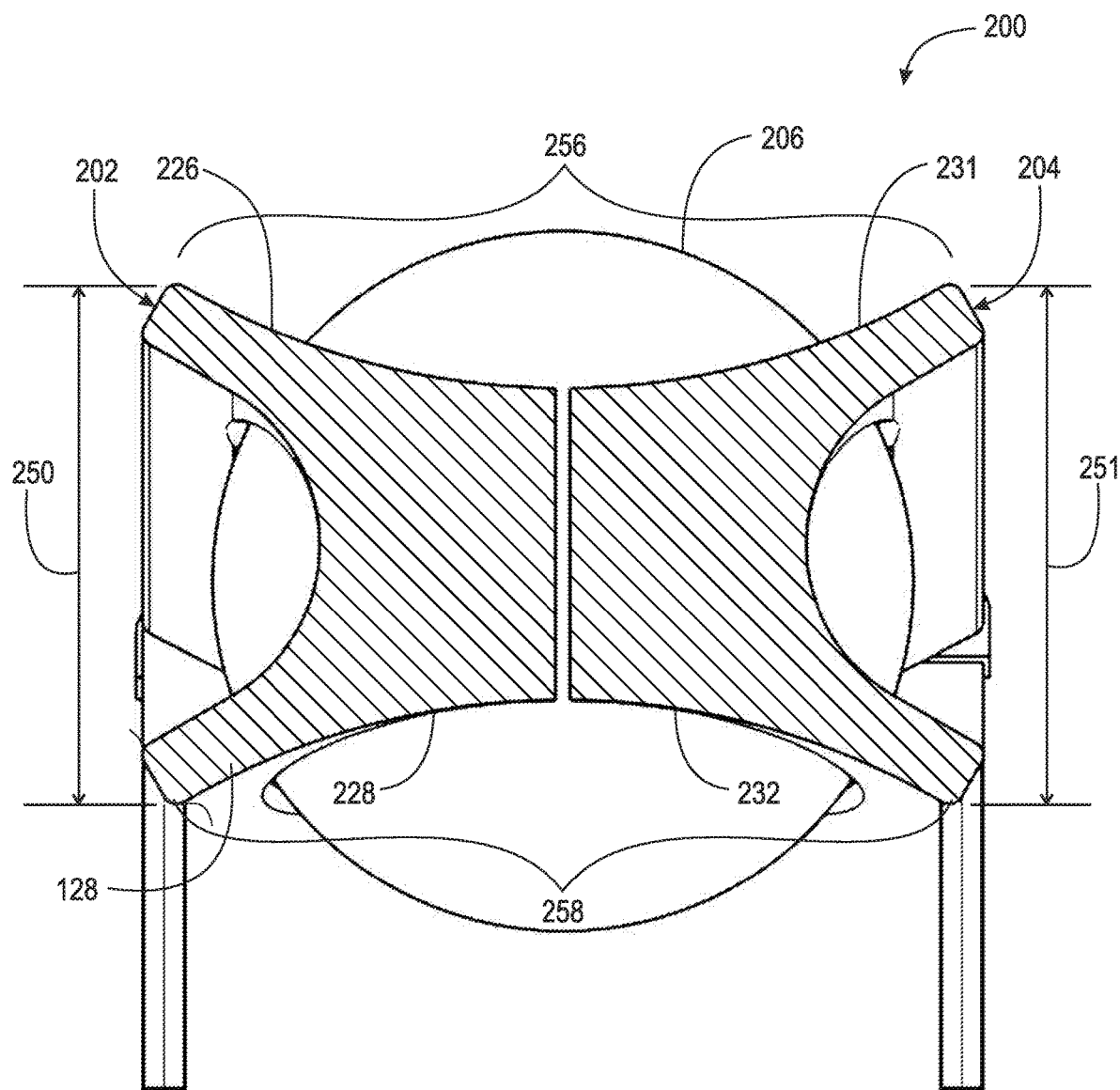
FIG. 14 is a cross-sectional view generally along line 14-14 in FIG. 11.
Figure 14:
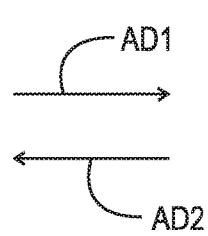
Figure 14:
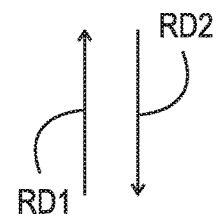

FIG. 14 is a cross-sectional view generally along line 14-14 in FIG. 11; and

Figure 15:
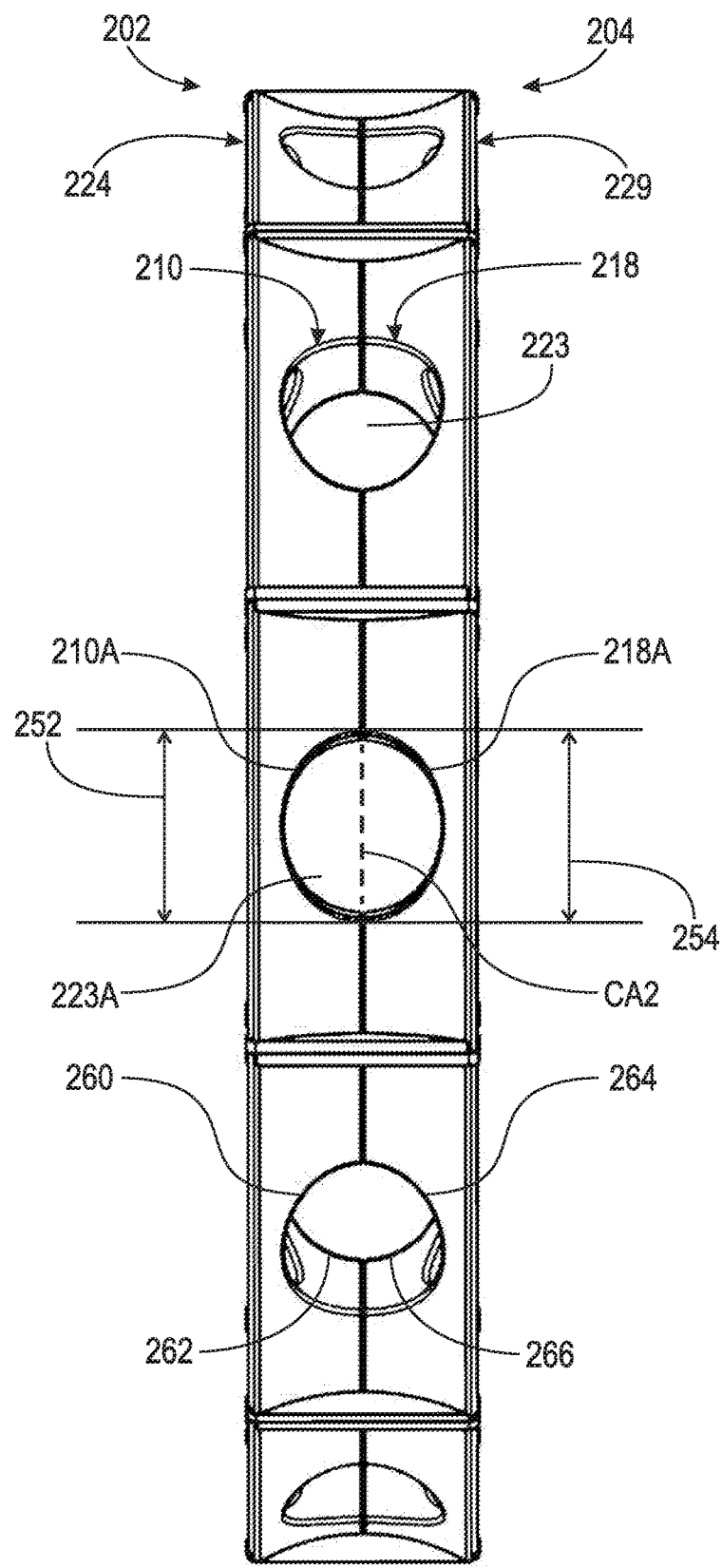
FIG. 15 is side view of the snap-fit bearing cage shown in FIG. 9 with balls removed.

FIG. 15 is a side view of snap-fit bearing cage 200 shown in FIG. 9 with balls 112 removed. The following should be viewed in light of FIGS. 9 through 15. Snap-fit bearing cage 200 includes: ring-half 202 and ring-half 204; and balls 206. Ring-halves 202 and 204 are supported for rotation around axis AR. Ring half 202 includes curved surfaces 210, protrusions 212, and protrusions 214. Ring half 204 includes curved surfaces 218, protrusions 220, and protrusions 222. Surfaces 210 and 218 curve at least in axial directions AD2 and AD1, respectively.

Each curved surface 210 forms with a curved surface 218, an opening 223 in which a ball 206 is disposed. Protrusions 212 and 214: extend in axial direction AD1; are in contact with ring-half 204; non-rotatably connect ring-half 202 and ring-half 204; and axially bind ring-half 202 to ring-half 204. That is, protrusions 212 and protrusions 214 prevent ring-half 202 and ring-half 204 from axially separating. Protrusions 220 and 222: extend in axial direction AD2; are in contact with ring-half 202; non-rotatably connect ring-half 204 and ring-half 202; and axially bind ring-half 204 to ring-half 202. That is, protrusions 220 and protrusions 222 prevent ring-half 204 and ring-half 202 from axially separating.

Ring-half 202 includes radially outer perimeter 224 including protrusions 212. Ring-half 202 includes radially inner perimeter 225 including protrusions 214. In the example of FIG. 9, radially outer perimeter 224 includes radially outermost surface segments 226 circumferentially interleaved with protrusions 212; and radially inner perimeter 225 includes radially innermost surface segments 228 circumferentially interleaved with protrusions 214. Segments 226 slope radially inwardly in axial direction AD1 and segments 228 slope radially outwardly in direction AD1.

Ring-half 204 includes radially outer perimeter 229 including protrusions 220. Ring-half 204 includes radially inner perimeter 230 including protrusions 222. In the example of FIG. 9, perimeter 229 includes radially outermost surface segments 231 circumferentially interleaved with protrusions 220; and perimeter 230 includes radially innermost surface segments 232 circumferentially interleaved with protrusions 222. Segments 231 slope radially inwardly in axial direction AD2. Segments 232 slope radially outwardly in direction AD2.

Balls 206 are located in openings 223. For each opening 223: the curved surface 210 is a mirror image of the curved surface 218. For example, for opening 223A: curved surface 210A is a mirror image of curved surface 218A with respect to hypothetical circular arc CA2 centered on the axis of rotation AR and passing through opening 223A between surfaces 210A and 218A.

For each opening 223: the curved surface 210 and the curved surface 218 are symmetrical. For example, for opening 223A: curved surface 210A and curved surface 218A symmetrical with respect to hypothetical circular arc CA2.

In an example embodiment: ring-half 204 includes shoulders 234; protrusions 212 include hooked distal ends 236; and each distal end 236 has a compression fit with a shoulder 234. In an example embodiment: ring-half 204 includes shoulders 238; protrusions 214 include hooked distal ends 240; and each distal end 240 has a compression fit with a shoulder 238. The snap-fit connections described above securely fasten ring-half 202 to ring-half 204.

In an example embodiment: ring-half 202 includes shoulders 242; protrusions 220 include hooked distal ends 244; and each distal end 244 has a compression fit with a shoulder 242. In an example embodiment: ring-half 202 includes shoulders 246; protrusions 222 include hooked distal ends 248; and each distal end 248 has a compression fit with a shoulder 246. The snap-fit connections described above securely fasten ring-half 204 to ring-half 202.

Ring-half 202 has maximum extent 250 in radial direction RD1 and ring-half 204 has maximum extent 251 equal to maximum extent 250, in direction RD1. In an example embodiment, each curved surface 210 has maximum extent 252 in radial direction CD1, and each curved surfaces 218 has maximum extent 254, equal to maximum extent 252, in direction CD1. The discussion for curved surfaces 114 and maximum extent 152 in radial direction RD1 is applicable to curved surfaces 210. The discussion curved surfaces 118 and maximum extent 153, equal to maximum extent 153, in direction RD1 is applicable to curved surfaces 218. That is, a maximum extent of curved surfaces 210 in direction RD1 is equal to a maximum extent of curved surfaces 218 in direction RD1.

Ring-half 202 and ring-half 204 define: recesses 256 extending radially inwardly; and recesses 258 extending radially outwardly. Recesses 256 are defined in part, for example in radial direction RD2, by segments 226 and 231. Recesses 258 are defined in part, for example in radial direction RD1, by segments 228 and 232. Curved surfaces 210 include edges 260 and 262 partly bounding recesses 256 and recesses 258, respectively. Curved surfaces 218 include edges 264 and 266 partly bounding recesses 256 and recesses 258, respectively.

The following paragraph is directed to an example embodiment. At least portions of protrusions 212 extend radially outwardly past segments 226 and at least portions of protrusions 214 extend radially inward past segments 228. At least portions of protrusions 220 extend radially outwardly past segments 230 and at least portions of protrusions 222 extend radially inward past segments 232. Pairs of protrusions 212 and 220 form blades 268 bounding, or alternately stated defining, recesses 256 in circumferential direction CD1 and CD2. Blades 268 separate circumferentially adjacent recesses 256. Pairs of protrusions 214 and 222 form blades 270 bounding, or alternately stated defining, recesses 258 in circumferential direction CD1 and CD2. Blades 270 separate circumferentially adjacent recesses 258. In an example embodiment, protrusions 212, 214, 220, and 222 are orthogonal to axis of rotation AR.

In an example embodiment: protrusions 212 and 214 are integral to ring-half 202; and protrusions 220 and 222 are integral to ring-half 204 For example: ring-half 202, including protrusions 212 and 214 is a single molded piece of plastic; and ring-half 204 including protrusions 220 and 222 is a single molded piece of plastic.

Ring-half 202 defines openings 272 in wall 274 facing in direction AD2. Balls 206 are disposed in openings 272. Ring-half 204 defines openings 276 in wall 278 facing in direction AD1. Balls 206 are disposed in openings 276. In the example of FIG. 9, surfaces 210 are circumferentially interleaved with (alternate with in direction CD1) surfaces 280 facing in direction AD1 and orthogonal to axis AR; and surfaces 218 are circumferentially interleaved with (alternate with in direction CD1) surfaces 280 facing in direction AD2 and orthogonal to axis AR.

Example embodiments of snap-fit bearing cages 102 and 200 fabricated of plastic reduce the weight of cages 102 and 200 in comparison to metal fabrication. Recesses 136 and 142 further reduce the weight of cage 102; and recesses 256 and 258 further reduce the weight of cage 200. Blades 169 and 170 stiffen cage 102. Blades 268 and 270 stiffen cage 200.

Blades 169 and 170 are configurable to control flow lubricating fluids. For example, blades 169 and 170 can be configured to direct lubricating fluid toward or away from balls 112. Blades 268 and 270 are configurable to control flow lubricating fluids. For example, blades 268 and 270 can be configured to direct lubricating toward or away from balls 206.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CA1 arc
CD2 arc
CD1 circumferential direction
CD2 circumferential direction
R radius
RD1 radial outward direction
RD2 radial inward direction
100 roller bearing
102 snap-fit bearing cage
104 inner ring
106 outer ring
108 ring-half
110 ring-half
112 balls
114 curved surface, ring-half 108
114A curved surface, ring-half 108
118 curved surface, ring-half 110
118A curved surface, ring-half 110
120 protrusion, ring-half 110
121 protrusion, ring-half 110
122 opening
122A opening
123 radially outer perimeter, ring-half 110
124 radially inner perimeter, ring-half 110
126 radially outermost surface segment, ring-half 110
128 radially innermost surface segment, ring-half 110
130 radially outer surface segment, ring-half 108
132 radially inner surface segment, ring-half 108
134 shoulder
136 recess
138 distal end
140 shoulder
142 recess
144 distal end
146 maximum radial extent, ring-half 108
147 maximum radial extent, ring-half 110
150 maximum circumferential extent, surface 114
151 maximum circumferential extent, surface 118
152 maximum radial extent, surface 114
153 maximum radial extent, surface 118
154 recess
156 recess
158 edge, recess 154
160 edge, recess 156
162 edge, recess 156
164 edge, recess 156
166 protrusion, ring-half 108
168 protrusion, ring-half 110
169 blade
170 blade
171 opening, ring-half 108
172 wall, ring-half 108
174 opening, ring-half 110
176 wall, ring-half 110
168 surface, ring-half 108
170 surface, ring-half 110
200 snap-fit bearing cage
202 ring-half
204 ring-half
206 balls
210 curved surface, ring-half 202
210A curved surface, ring-half 202
212 protrusion, ring-half 202
214 protrusion, ring-half 202
218 curved surface, ring-half 204
218A curved surface, ring-half 204
220 protrusion, ring-half 204
222 protrusion, ring-half 204
223 opening
223A opening
224 radially outer perimeter, ring-half 202
225 radially inner perimeter, ring-half 202
226 radially outermost surface segment, ring-half 202
228 radially innermost surface segment, ring-half 202
229 radially outer perimeter, ring-half 204
230 radially inner perimeter, ring-half 204
231 radially outermost surface segment, ring-half 204
232 radially innermost surface segment, ring-half 204
234 shoulder
236 distal end
238 shoulder
240 distal end
242 shoulder
244 distal end
246 shoulder
248 distal end
250 maximum radial extent
251 maximum radial extent
252 maximum circumferential extent
254 maximum circumferential extent
256 recess
258 recess
260 edge, surface 210
262 edge, surface 210
264 edge, surface 218
266 edge, surface 218
268 blade
270 blade
272 opening, ring-half 202
274 wall, ring-half 202
276 opening, ring-half 204
278 wall, ring-half 204
280 surface, ring-half 202
282 surface, ring-half 204

The invention claimed is:
1. A snap-fit ball bearing cage, comprising:
a first ring-half:
supported for rotation around an axis of rotation; and,
including a plurality of first curved surfaces;
a second ring-half including:
a plurality of second curved surfaces; and,
a plurality of first protrusions non-rotatably connecting the second ring-half to the first ring-half, each first protrusion, included in the plurality of first protrusions, forming a portion of a radially outer perimeter of the second ring-half or each first protrusion, included in the plurality of first protrusions, forming a portion of a radially inner perimeter of the second ring-half; and,
a plurality of balls, wherein:
the plurality of first curved surfaces and the plurality of second curved surfaces define a plurality of openings;
the plurality of balls is disposed in the plurality of openings;
each first curved surface, included in the plurality of first curved surfaces, is a mirror image of a second curved surface included in the plurality of second curved surfaces;
the first ring-half includes a radially inner perimeter with a plurality of first surface segments;
the radially inner perimeter of the second ring-half includes a plurality of second surface segments;
the plurality of first surface segments and the plurality of second surface segments define a plurality of recesses extending radially outwardly; and,
each ball, included in the plurality of balls, is disposed in a recess included in the plurality of recesses extending radially outwardly.

2. The snap-fit ball bearing cage of claim 1, wherein:
each first protrusion forms the portion of the radially outer perimeter of the second ring-half; and,
the second ring-half includes a plurality of second protrusions non-rotatably connecting the second ring-half to the first ring-half, each second protrusion, included in the plurality of second protrusions, forming the portion of the radially inner perimeter of the second ring-half.

3. The snap-fit ball bearing cage of claim 1, wherein:
each first curved surface and the second curved surface define an opening included in the plurality of openings; and,
each first curved surface is a mirror image of the second curved surface with respect to a hypothetical circular arc centered on the axis of rotation and passing through the opening.

4. The snap-fit ball bearing cage of claim 1, wherein:
the first ring-half includes a plurality of shoulders; and,
each first protrusion has a snap-fit with a shoulder included in the plurality of shoulders.

5. The snap-fit ball bearing cage of claim 1, wherein:
the first ring-half includes a plurality of second protrusions non-rotatably connecting the first ring-half to the second ring-half; and,
each second protrusion, included in the plurality of second protrusions, forms a portion of a radially outer perimeter of the first ring-half; or,
each second protrusion, included in the plurality of second protrusions, forms a portion of a radially inner perimeter of the first ring-half.

6. The snap-fit ball bearing cage of claim 5, wherein:
the first ring-half includes a plurality of first shoulders;
the second ring-half includes a plurality of second shoulders;
each first protrusion has a compression fit with a first shoulder included in the plurality of first shoulders; and,
each second protrusion has a compression fit with a second shoulder included in the plurality of second shoulders.

7. The snap-fit ball bearing cage of claim 1, wherein:
the first ring-half has a first maximum extent in a radial direction perpendicular to the axis of rotation, and the second ring-half has a second maximum extent, equal to the first maximum extent, in the radial direction; or,
each first curved surface has a first maximum extent in a circumferential direction around the axis of rotation, and the second curved surface has a second maximum extent, equal to the first maximum extent, in the circumferential direction.

8. The snap-fit ball bearing cage of claim 1, wherein:
the first ring-half includes a radially outer perimeter including a plurality of first surface segments;
the radially outer perimeter of the second ring-half includes a plurality of second surface segments;
the plurality of first surface segments and the plurality of second surface segments define a plurality of recesses extending radially inwardly; and,
each ball, included in the plurality of balls, is disposed in a recess included in the plurality of recesses extending radially inwardly.

9. The snap-fit ball bearing cage of claim 8, wherein:
each first protrusion forms the portion of the radially outer perimeter of the second ring-half;
the first ring-half includes a plurality of second protrusions; and,
the plurality of first protrusions and the plurality of second protrusions define, in a circumferential direction, around the axis of rotation, the plurality of recesses extending radially inwardly.

10. The snap-fit ball bearing cage of claim 1, wherein:
each first protrusion forms the portion of the radially inner perimeter of the second ring-half;
the first ring-half includes a plurality of second protrusions; and,
the plurality of first protrusions and the plurality of second protrusions define, in a circumferential direction, around the axis of rotation, the plurality of recesses extending radially inwardly.

11. The snap-fit ball bearing cage of claim 1, wherein:
the plurality of first protrusions is integral to the second ring-half;
the first ring-half includes a plurality of second protrusions non-rotatably connecting the first ring-half to the second ring-half;
each second protrusion, included in the plurality of second protrusions, forms a portion of a radially outer perimeter of the first ring-half, or each second protrusion, included in the plurality of second protrusions, forms a portion of a radially inner perimeter of the first ring-half; and,
the plurality of second protrusions is integral to the first ring-half.

12. A snap-fit ball bearing cage, comprising:
a first ring-half supported for rotation around an axis of rotation and including:
a first plurality of protrusions integral to the first ring-half and extending radially outwardly; and,
a first plurality of surface segments facing at least partly radially outwardly;
a second ring-half including:
a second plurality of protrusions integral to the second ring-half, non-rotatably connecting the second ring-half to the first ring-half, and extending radially outwardly; and,
a second plurality of surface segments facing at least partly radially outwardly; and,
a plurality of balls, wherein:
the first ring-half and the second ring-half define a plurality of openings;

each ball, included in the plurality of balls, is disposed in an opening included in the plurality of openings;

the first plurality of surface segments and the second plurality of surface segments define, in a radial direction, a plurality of radially inwardly extending recesses; and, the first plurality of protrusions and the second plurality of protrusions bracket, in a circumferential direction around the axis of rotation, the plurality of radially inwardly extending recesses.

13. The snap-fit ball bearing cage of claim 12, wherein:
the first ring-half includes:
   a third plurality of protrusions integral to the first ring-half and extending radially inwardly; and,
   a third plurality of surface segments facing at least partly radially inwardly;
the second ring-half includes:
   a fourth plurality of protrusions integral to the second ring-half, non-rotatably connecting the second ring-half to the first ring-half, and extending radially inwardly; and,
   a fourth plurality of surface segments facing at least partly radially inwardly;
the third plurality of surface segments and the fourth plurality of surface segments define, in a radial direction, a plurality of radially outwardly extending recesses; and,
the third plurality of protrusions and the fourth plurality of protrusions bracket, in the circumferential direction, the plurality of radially outwardly extending recesses.

14. The snap-fit ball bearing cage of claim 13, wherein:
the first ring-half includes a radially outermost surface including the first plurality of protrusions and the first plurality of surface segments;
the second ring-half includes a radially outermost surface including the second plurality of protrusions and the second plurality of surface segments;
the first ring-half includes a radially innermost surface including the third plurality of protrusions and the third plurality of surface segments; and,
the second ring-half includes a radially innermost surface including the fourth plurality of protrusions and the fourth plurality of surface segments.

15. The snap-fit ball bearing cage of claim 12, wherein:
the first ring-half includes a plurality of first curved surfaces;
the second ring-half includes a plurality of second curved surfaces;
the plurality of first curved surfaces and the plurality of second curved surfaces define the plurality of openings;
the first ring-half has a first maximum extent in a radial direction perpendicular to the axis of rotation;
the second ring-half has a second maximum extent in the radial direction; and,
the first maximum extent is equal to the second maximum extent, or each first curved surface, included in the plurality of first curved surfaces, is symmetrical with respect to a second curved surface, included in the plurality of second curved surfaces.

16. The snap-fit ball bearing cage of claim 12, further comprising:
a plurality of radially inwardly extending recesses; and,
a plurality of radially outwardly extending recesses, wherein:
   the first ring-half includes a first curved surface;
   the second ring-half includes a second curved surfaces the first curved surfaces and the second curved surfaces bracket an opening included in the plurality of openings;
the first curved surface includes a first edge defining a portion of a radially inwardly extending recess, included in the plurality of radially inwardly extending recesses;
the first curved surface includes a second edge defining a portion of a radially outwardly extending recess, included in the plurality of radially outwardly extending recesses;
the second curved surface includes a first edge defining the portion of the radially inwardly extending recess; and,
the second curved surface includes a second edge defining the portion of the radially outwardly extending recess.

17. A snap-fit ball bearing cage, comprising:
a first ring-half supported for rotation around an axis of rotation and including:
   a plurality of first curved surfaces, each first curved surface having a first maximum extent in a circumferential direction around the axis of rotation; and,
   a plurality of first shoulders;
a second ring-half including:
   a plurality of second curved surfaces, each second curved surface having a second maximum extent, equal to the first maximum extent, in the circumferential direction; and,
   a plurality of first protrusions non-rotatably connecting the second ring-half to the first ring-half and forming a portion of a radially outermost surface of the second ring-half or forming a portion of a radially innermost surface of the second ring-half, each first protrusion including a distal end with a compression fit with a first shoulder included in the plurality of first shoulders; and,
a plurality of balls, each ball located in an opening defined by a first curved surface, included in the plurality of first curved surfaces and by a second curved surface included in the plurality of second curved surfaces, wherein:
   the first ring-half includes a radially outermost surface including a plurality of first surface segments;
   the radially outermost surface of the second ring-half includes a plurality of second surface segments;
   the plurality of first surface segments and the plurality of second surface segments define a plurality of recesses extending radially inwardly; and,
   each ball included in the plurality of balls is disposed in a recess included in the plurality of recesses extending radially inwardly.

18. The snap-fit ball bearing cage of claim 17, wherein:
the second ring-half includes a plurality of second shoulders; and,
the first ring-half includes a plurality of second protrusions non-rotatably connecting the first ring-half to the second ring-half and forming a portion of a radially outermost surface of the first ring-half or forming a portion of a radially innermost surface of the first ring-half, each second protrusion, included in the plurality of second protrusions, including a distal end with a compression fit with a second shoulder included in the plurality of second shoulders.

* * * * *